Feb. 5, 1929.
B. P. JOYCE ET AL
1,700,894
METALLIC PACKING FOR A FLUID UNDER PRESSURE
Filed Aug. 18, 1924
2 Sheets-Sheet 2

INVENTOR
Bryan P. Joyce
C. V. Lorrain
BY
W. N. Roach.
ATTORNEY

Patented Feb. 5, 1929.

1,700,894

UNITED STATES PATENT OFFICE.

BRYAN P. JOYCE AND CAMILLE V. LORRAIN, OF DAVENPORT, IOWA, SAID LORRAIN ASSIGNOR TO SAID JOYCE.

METALLIC PACKING FOR A FLUID UNDER PRESSURE.

Application filed August 18, 1924. Serial No. 732,876.

The subject of this invention is a metallic packing for a fluid under pressure.

The primary object of this invention is to provide a packing for stationary or movable joints in which the pressure of a confined fluid is introduced to an intermediate packing ring to expand the same to more effectually seal the fluid chamber.

To these and other ends, our invention consists in the construction, arrangement, and combination of elements, described hereinafter and pointed out in the claims forming a part of this specification.

Figure 1:
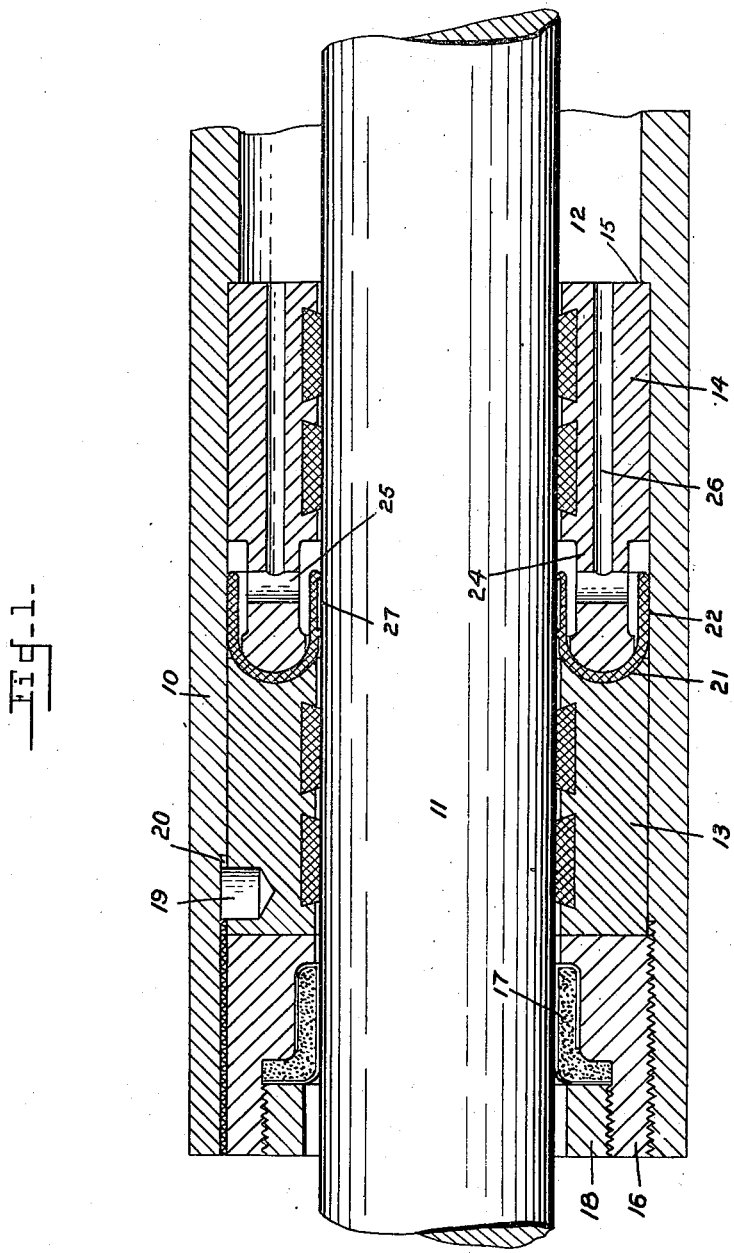
Figure 2:
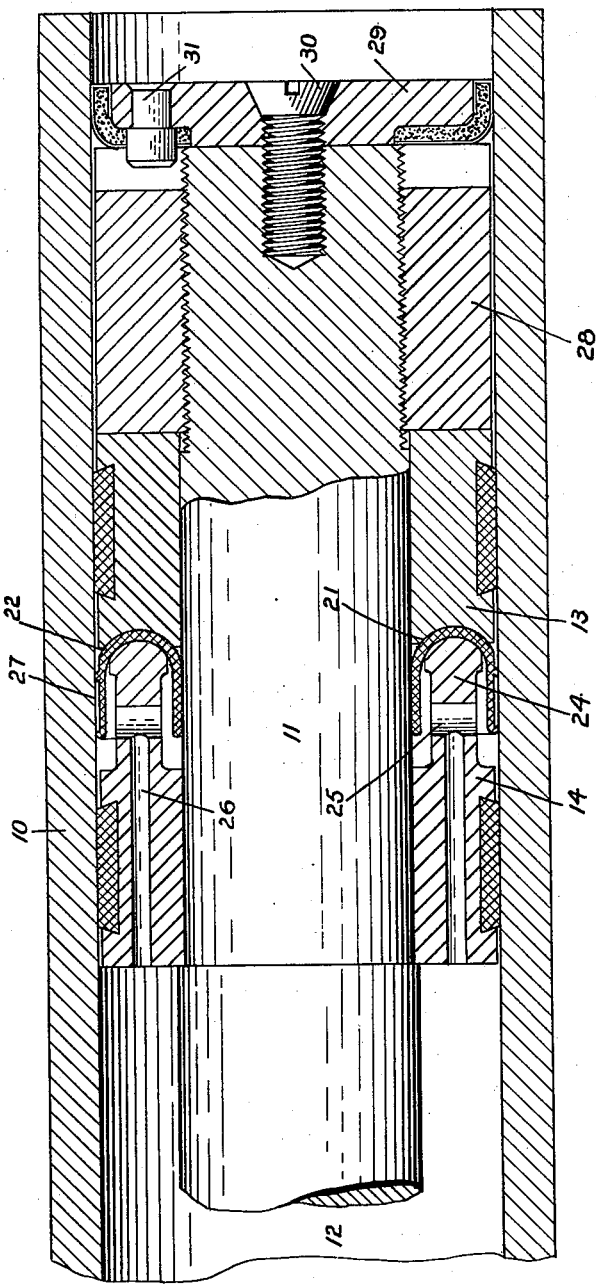

A practical embodiment of our invention is illustrated in the accompanying drawings, in which, Fig. 1 is a longitudinal sectional view of the stuffing box packing; and Fig. 2 is a similar view of the other end of the casing showing the piston packing.

Referring to the drawings by numerals of reference:

A cylindrical casing 10, in which is reciprocally mounted a piston 11, is adapted to contain a fluid in a chamber 12.

Referring to Figure 1, one end of the cylinder is closed by a stationary packing which comprises a pair of metallic packing rings 13 and 14 spaced from the piston and provided with anti-friction rings for supporting the piston. The packing is stationarily held against an internal annular shoulder 15 in the casing by a retaining nut 16 counterbored to carry a leather wiper 17 encased in tin foil and also tapped for the reception of a metal ring 18 for holding the wiper in place. The outer packing ring 13 is held against rotation by a pin 19 carried thereby and engageable in a slot 20 in the casing.

The outer packing ring 13 is formed with a concave forward face 21, in which is seated a cup ring 22, securely held to its seat by the convex face 23 of an attenuated portion 24 of the inner packing ring 14.

The attenuated portion 24 is spaced from the walls of the cup ring 22 and is formed with a plurality of transverse ducts 25, intersected by a series of ducts 26 extending through the ring 14, to permit fluid from the chamber 12 to be forced into the cup ring on retraction of the piston whereby to expand the cup ring into sealing contact with the casing and the piston. The ducts 25 are so positioned that the fluid on entering the cup ring will act on its marginal portion in order to more readily expand the ring.

The attenuated portion 24 extends a sufficient distance beyond the rim of the cup ring to provide for lubrication of the piston.

The inner wall of the cup ring is formed with a peripheral groove to dispose a band 27 of a ductile metal, such as tin, carried thereby against the polished surface of the piston.

The packing shown in Figure 2, as forming the piston head, is essentially identical in principle, the anti-friction elements obviously being in contact with the casing where they also serve in conjunction with the similar elements in the stationary packing to prevent distortion of the packing due to the whip of the piston rod.

The piston packing is confined between an annular shoulder on the piston and a retaining nut 28 which is securely held by a metal disc 29 fastened to the piston rod by a screw 30. The metal disc retains the wiper in place and is prevented from rotating by a rivet 31 engaging in a slot in the retaining nut 28.

While in the foregoing there has been illustrated and described such combination and arrangement of elements as constitute the preferred embodiment of our invention it is nevertheless desired to emphasize the fact that interpretation of the invention should only be conclusive when made in the light of the subjoined claims.

We claim:

1. In combination with a casing and a reciprocable member mounted therein, of a packing assembly embracing said member and comprising a thin resilient metal cup ring, means for supporting the cup ring without restricting its contact, means to admit fluid pressure within the cup ring for sealing pressure, means to prevent excessive distortion of the cup ring by limiting eccentric movement of the moving part, and metal contact wiping means to clean the friction surface before it contacts the cup ring.

2. In combination with inner and outer members, one of which is reciprocable with respect to the other, of a packing assembly between the members and comprising two relatively wide rings carried by one of the members and having on their friction contact surfaces grooves containing anti-friction metal, one of said rings having at one end an attenuated portion formed with transverse ducts and intersecting longitudinal ducts to receive fluid pressure, said attenuated portion having a convex face opposed to a concave face formed on the adjacent end of the other ring, a resilient metal cup ring on said attenuated portion and held between said convex and concave faces, and a metal faced wiper ring to clean the friction surface of one of said members before it contacts the cup ring.

BRYAN P. JOYCE.
CAMILLE V. LORRAIN.